(12) United States Patent
Fusamae et al.

(10) Patent No.: US 7,005,469 B2
(45) Date of Patent: Feb. 28, 2006

(54) MODIFIED RUBBER, PROCESS FOR PRODUCING THE SAME, AND COMPOSITION

(75) Inventors: Hiroshi Fusamae, Kanagawa (JP); Keiichi Toda, Oita (JP)

(73) Assignee: Japan Elastomer Co., Ltd., Tokyo (JP)

( * ) Notice: Subject to any disclaimer, the term of this patent is extended or adjusted under 35 U.S.C. 154(b) by 250 days.

(21) Appl. No.: 10/257,569

(22) PCT Filed: Feb. 14, 2002

(86) PCT No.: PCT/JP02/01252

§ 371 (c)(1),
(2), (4) Date: Oct. 15, 2002

(87) PCT Pub. No.: WO02/064363

PCT Pub. Date: Aug. 22, 2002

(65) Prior Publication Data

US 2003/0119966 A1 Jun. 26, 2003

(30) Foreign Application Priority Data

Feb. 15, 2001 (JP) .............................. 2001-038386

(51) Int. Cl.
*C08K 3/34* (2006.01)
(52) U.S. Cl. ................ 524/495; 525/332.8; 525/332.9
(58) Field of Classification Search ................ 524/492, 524/495, 496; 525/332.4, 332.5, 332.7, 332.8, 525/332.9, 333.1, 333.3, 333.6, 333.9, 333.5
See application file for complete search history.

(56) References Cited

U.S. PATENT DOCUMENTS

| 4,362,785 A | 12/1982 | Schultz et al. |
| 5,227,425 A | 7/1993 | Rauline |
| 2003/0199669 A1 * | 10/2003 | Saito et al. ................ 528/393 |

FOREIGN PATENT DOCUMENTS

| EP | 0 260 325 A1 | 3/1988 |
| EP | 0 564 050 A2 | 10/1993 |
| EP | 1 116 742 A1 | 7/2001 |
| JP | 56-90849 A | 7/1981 |
| JP | 62-227908 A | 10/1987 |
| JP | 1-158004 A | 6/1989 |
| JP | 3-287617 A | 12/1991 |
| JP | 07-330959 | * 12/1995 |
| JP | 8-53513 A | 2/1996 |
| JP | 8-53576 A | 2/1996 |
| JP | 9-225324 A | 9/1997 |

* cited by examiner

*Primary Examiner*—Katarzyna Wyrozebski
(74) *Attorney, Agent, or Firm*—Birch, Stewart, Kolasch & Birch, LLP

(57) ABSTRACT

The invention relates to: a modified rubber having a specific structure modified with a compound having two or more epoxy groups in the molecule; and a process for producing a modified rubber which includes copolymerizing a vinylaromatic hydrocarbon and a conjugated diene by the solution polymerization method using an organolithium as an initiator and modifying the resultant copolymer with a compound having two or more epoxy groups in the molecule. The invention further relates to a modified-rubber composition obtained by compounding a raw rubber containing the modified rubber with silica, and to rubber vibration isolators and a footwear article each obtained from the modified-rubber composition.

13 Claims, No Drawings

MODIFIED RUBBER, PROCESS FOR PRODUCING THE SAME, AND COMPOSITION

This application is the national phase under 35 U.S.C. § 371 of PCT International Application No. PCT/JP02/01252 which has an International filing date of Feb. 14, 2002, which designated the United States of America.

TECHNICAL FIELD

The present invention relates to a modified rubber which gives a vulcanized rubber composition excellent in resistance to compression set (c-set) and in temperature dependence of viscoelasticity, a process for producing the modified rubber, and a modified-rubber composition containing the modified rubber. More particularly, the invention relates to: a modified rubber comprising a vinylaromatic hydrocarbon/conjugated diene block copolymer of a specific structure having an end modified with a specific compound containing epoxy groups; a process for producing the modified rubber in which a vinylaromatic hydrocarbon/conjugated diene block copolymer of a specific structure produced by anionic polymerization and containing active lithium is modified by reaction with a compound having two or more epoxy groups per molecule; and a modified-rubber composition obtained by compounding the modified rubber mainly with silica. The invention furthermore relates to rubber vibration isolators and an article of footwear each obtained from the modified-rubber composition and excellent in resistance to compression set (c-set) and in temperature dependence of viscoelasticity.

BACKGROUND ART

Japanese Patent Laid-Open No. 287617/1991 proposes as a block polymer a thermoplastic elastomer having a structure represented by the general formula $(A-B)_n-X$ (wherein A represents a vinylaromatic polymer block and B represents a diene compound polymer block). However, thermoplastic elastomers of this kind have two or more independent vinylaromatic polymer blocks in the molecule and necessitate an exceedingly high processing temperature due to the cohesive force of the vinylaromatic polymer blocks. It is therefore difficult to compound such elastomer with silica, carbon black, or the like and vulcanize the composition with sulfur.

Recently, many techniques have been proposed for incorporating silica into a raw rubber to produce a rubber composition for tires designed for attaining resource saving and energy saving.

Namely, in those techniques, silica or a combination of silica and carbon black is incorporated into a rubber, in place of the incorporation of carbon black in preparing tire tread rubbers heretofore in use, to thereby obtain a higher impact resilience, heighten the low-temperature (0° C.) tan δ of viscoelasticity for improving wet skid resistance, and simultaneously lower the high-temperature (50–70° C.) tan δ for reducing tire rolling resistance so as to attain a reduced energy loss.

A typical technique is proposed, for example, in U.S. Pat. No. 5,227,425. In this technique, silica is used as a reinforcing filler for an SBR having a specific structure and the rubber composition is kneaded under specific conditions to thereby obtain a tread rubber composition having an improved balance between fuel-saving performance and wet skid resistance.

For improving the dispersibility of silica in such a rubber composition is used a silane coupling agent such as bis(triethoxypropyl) tetrasulfide.

Furthermore, techniques for the terminal modification of a rubber with various alkoxysilyl groups and silica-containing rubber compositions produced with these techniques are proposed in Japanese Patent Laid-Open Nos. 227908/1987, 53513/1996, 53576/1996, 225324/1997, etc. These techniques are intended to improve the dispersibility of silica in rubbers and to reduce the amount of the silane coupling agent to be used.

These alkoxysilyl-modified polymers are obtained by reacting a terminal-active polymer obtained by anionic polymerization with a specific alkoxysilane compound.

The rubber compositions according to the various techniques described above are intended mainly to improve the balance between the wet skid resistance and rolling resistance of tires. Namely, those techniques are intended to modify viscoelastic properties so as to heighten the low-temperature (0° C.) tan δ for improving wet skid resistance and lower the high-temperature (50–70° C.) tan δ for reducing rolling resistance.

However, such rubber compositions have problems, for example, that performances change considerably according to conditions, e.g., with changing ambient temperature. For example, the rubber in a low-temperature range (e.g., 0° C.) has an increased hardness and is reduced in rubber elasticity, e.g., impact resilience, due to the heightened tan δ in the low-temperature range. In a high-temperature range (50–70° C.), on the other hand, the rubber has a lowered tan δ and, hence, has a reduced hardness.

DISCLOSURE OF THE INVENTION

In order to overcome the problems described above, the present inventors made extensive investigations on the distribution of vinylaromatic hydrocarbons in vinylaromatic hydrocarbon/conjugated diene copolymers and on modifying groups therein. As a result, it has been found that a modified-rubber/silica composition in which the modified rubber is one obtained from a copolymer having a specific structure with respect to the distribution of a vinylaromatic hydrocarbon by modifying an end of the vinylaromatic hydrocarbon polymer block of the copolymer with a compound having two or more epoxy groups in the molecule is excellent especially in c-set and in the temperature dependence and strain dependence of viscoelasticity. The invention has been achieved based on this finding.

Namely, the invention relates to a modified rubber comprising a modified copolymer represented by the general formula $(R-B)_n-X$ obtained by modifying a copolymer having an (R-B) structure, wherein the modified rubber has a total bound vinylaromatic hydrocarbon content of from 5 to 60% by weight, a bound vinylaromatic hydrocarbon polymer block content of from 3 to 40% by weight, and a vinyl content in the conjugated diene moieties of 80% by mole or lower and the main-peak molecular weight of the molecules which have been coupled by a modifier is from 100,000 to 1,500,000 as determined by GPC (wherein, in the formulae, R represents a conjugated diene polymer or a vinylaromatic hydrocarbon/conjugated diene random copolymer having a bound vinylaromatic hydrocarbon content of 50% by weight or lower; B represents a vinylaromatic hydrocarbon/conjugated diene copolymer having a vinylaromatic hydrocarbon polymer block or represents a vinylaromatic hydrocarbon polymer block, the R/B weight ratio being in the range of from 30/70 to 97/3; n is an integer of 1 or larger; and X represents a modification residue of a compound having two or more epoxy groups per molecule).

The invention further relates to a process for producing the modified rubber which comprises: producing a block copolymer having an (R-B) structure comprising a vinylaromatic hydrocarbon and a conjugated diene by a solution polymerization method using an organolithium compound as an initiator; and modifying the copolymer by reacting active ends of the copolymer with a compound having two or more epoxy groups per molecule.

The invention still further relates to a modified-rubber composition which comprises 100 parts by weight of one or more rubbers comprising the modified rubber of the invention (or from 99 to 20% by weight the modified rubber of the invention and from 1 to 80% by weight at least one rubber selected from natural rubber, polybutadiene rubbers, styrene/butadiene rubbers, and polyisoprene rubbers) and from 5 to 150 parts by weight of silica.

The invention furthermore relates to rubber vibration isolators and an article of footwear each obtained from the modified-rubber composition.

BEST MODE FOR CARRYING OUT THE INVENTION

The invention will be explained below in detail.

The modified rubber of the invention which is represented by the general formula $(R-B)_n-X$ is formed from one or more vinylaromatic hydrocarbons and one or more conjugated dienes. Examples of the vinylaromatic hydrocarbons include styrene, α-methylstyrene, p-methylstyrene, and the like. Examples of the conjugated dienes include 1,3-butadiene, isoprene, 2,3-dimethyl-1,3-butadiene, and the like.

In the modified rubber of the invention, the total bound vinylaromatic hydrocarbon content is from 5 to 60% by weight, preferably from 10 to 50% by weight. Total bound vinylaromatic hydrocarbon contents lower than 5% by weight are undesirable in that the composition has too low mechanical strength. Total bound vinylaromatic hydrocarbon contents exceeding 60% by weight are undesirable in that the results are impaired c-set, too high a value of low-temperature tan δ of viscoelasticity, and hence impaired rubber elasticity.

Furthermore, the bound vinylaromatic hydrocarbon polymer block content is from 3 to 40% by weight, preferably from 5 to 30% by weight. Bound vinylaromatic hydrocarbon polymer block contents lower than 3% by weight are undesirable in that the temperature dependence and strain dependence of viscoelasticity are enhanced. In case where the vinylaromatic hydrocarbon block content exceeds 40% by weight, the modified rubber has heightened hardness and too high a value of tan δ, resulting in reduced rubber elasticity and impaired c-set.

In the modified rubber of the invention, the vinyl content in the conjugated diene moieties is 80% by mole or lower, preferably from 10 to 70% by mole, more preferably from 10 to 65% by mole. Vinyl contents exceeding 80% by mole are undesirable in that the vulcanizate is impaired in low-temperature performance, wear resistance, etc.

The molecular weight of the modified rubber of the invention which is represented by the general formula $(R-B)_n-X$, as measured by GPC and calculated based on standard polystyrene samples, is from 100,000 to 1,500,000, preferably from 150,000 to 1,200,000, more preferably from 200,000 to 1,000,000, in terms of the main-peak molecular weight of the parts which have been coupled by a modifier. The modified parts basically have a branched structure because they have been modified with a compound having two or more epoxy groups. Main-peak molecular weights lower than 100,000 are undesirable for the molecules coupled by the modifier, because this modified rubber is impaired in mechanical strength, dynamic property, c-set, etc. Main-peak molecular weights thereof exceeding 1,500,000 are undesirable in that the modified rubber has a considerably reduced degree of modification and shows impaired processability when used as a composition.

It is recommended that in the modified rubber of the invention, the molecular weight of the vinylaromatic polymer block before modification should be from 5,000 to 50,000, preferably from 7,000 to 40,000, more preferably from 10,000 to 30,000. This molecular weight of the vinylaromatic hydrocarbon polymer block means the main-peak molecular weight determined through measurement by gel permeation chromatography (GPC) and calculation based on standard polystyrene samples. In case where the vinylaromatic hydrocarbon polymer block has too low a molecular weight, there is an undesirable tendency for the modified rubber to have the enhanced temperature dependence and strain dependence of viscoelasticity. In case where the vinylaromatic hydrocarbon polymer block has too high a molecular weight, there is an undesirable tendency for the modified rubber to have higher hardness and reduced rubber elasticity and have too high a Mooney viscosity or the like, resulting in impaired handleability or the like.

In the related-art vulcanized rubber compositions of a block copolymer formed from a conjugated diene compound and a vinylaromatic hydrocarbon compound, performances such as dynamic properties and c-set have been reduced by the vinylaromatic hydrocarbon polymer block in the rubber. In contrast, the modified rubber of the invention has a high affinity for silica due to a structural feature thereof, i.e., because the vinylaromatic hydrocarbon polymer block segment in the rubber has been modified with a compound having two or more epoxy groups in the molecule. The modified rubber hence gives a composition having excellent dynamic properties.

The partial polymer structure R of the modified rubber of the invention is a conjugated diene polymer or a random copolymer of a vinylaromatic hydrocarbon and a conjugated diene. In the case of the random copolymer, the bound vinylaromatic hydrocarbon content thereof is 50% by weight or lower, more preferably 40% by weight or lower. Bound vinylaromatic hydrocarbon contents exceeding 50% by weight are undesirable in that the modified rubber has heightened hardness and too high a value of tan δ at low temperatures, resulting in impaired rubber elasticity and impaired c-set.

The partial polymer structure B of the modified rubber of the invention is a vinylaromatic hydrocarbon polymer block or a vinylaromatic hydrocarbon/conjugated diene block copolymer having a vinylaromatic hydrocarbon polymer block at an end.

In the invention, the partial polymer structure R and partial polymer structure B in the modified rubber may be arranged in complete block distribution or in the so-called tapered-block distribution, in which the bound vinylaromatic hydrocarbon content increases continuously from R to B.

Although the modified rubber of the invention is basically represented by the general formula $(R-B)_n-X$, a modified rubber in which the partial structure B has a low-molecular conjugated diene polymer or low-molecular conjugated diene/vinylaromatic hydrocarbon random copolymer bonded to that end of the vinylaromatic hydrocarbon polymer block of the partial structure B which is bonded to the modifying group X also has satisfactory performances. However, the molecular weight of the low-molecular polymer segment bonded to the partial structure B is lower than 5,000, preferably lower than 3,000, more preferably lower than 2,500. In case where the low-molecular polymer segment has a molecular weight of 5,000 or higher, the modifying effect of coupling with the modifier on the vinylaromatic hydrocarbon polymer block is reduced, resulting in impaired viscoelastic properties. In the modified rubber of the invention, the copolymer having an (R-B) structure before modification has a molecular weight of from 30,000 to 500,000, preferably from 80,000 to 350,000, more preferably from 100,000 to 350,000. This molecular weight of the copolymer before modification means the main-peak molecular weight determined through GPC and calculation based on standard polystyrene samples. In case where the molecular weight of the copolymer before modification is lower than 30,000, the modified-rubber composition has poor mechanical strength. In case where the molecular weight thereof exceeds 500,000, there is an undesirable tendency for the composition to be reduced in processability, etc.

The modified rubber of the invention comprises copolymer chains which each have been modified at an end with a compound having two or more epoxy groups per molecule. When the number of epoxy groups in the modifier is m, then the modified rubber has a structure comprising the modifier and bonded thereto from 1 to m copolymer molecules of an (R-B) structure. Virtually, the modified rubber of the invention is a mixture of molecules each made up of the modifier and bonded thereto from 1 to m copolymer molecules having an (R-B) structure. It is recommended that the number of copolymer molecules, n, bonded to the modifier be from 2 to 10 on the average, preferably from 2 to 8, more preferably from 2 to 6.

In the modified rubber of the invention, at least 20% by weight of the copolymer molecules having an (R-B) structure have been modified with a compound having two or more epoxy groups per molecule. This degree of modification is preferably 40% by weight or higher, more preferably 50% by weight or higher.

In case where the degree of modification is lower than 20% by weight, there is an undesirable tendency for the silica-containing composition of the invention to have impaired c-set, enhanced temperature dependence and strain dependence of tan δ of viscoelasticity, etc.

A process for producing the modified rubber of the invention will be explained.

The modified rubber of the invention can be produced by copolymerizing a vinylaromatic hydrocarbon and a conjugated diene in an inert organic solvent using an organolithium compound as an initiator to produce a copolymer having an (R-B) structure and modifying it by reacting active lithium ends thereof with a compound having two or more epoxy groups per molecule.

Preferred examples of the polymerization solvent include inert organic solvents such as aliphatic hydrocarbons, e.g., butane, pentane, hexane, and heptane, alicyclic hydrocarbons, e.g., cyclopentane, cyclohexane, and methylcyclopentane, aromatic hydrocarbons, e.g., benzene, toluene, and xylene, mixtures of these, and the like.

The amount of the polymerization solvent to be used is not particularly limited. However, the viscosity and handleability of the polymer to be obtained, profitability, etc. are taken into account in determining the amount thereof. The amount of the solvent to be used is preferably about from 1 to 25 times the total monomer amount. There are cases where the solvent is wholly used prior to initiation of the polymerization or the solvent is additionally added during the polymerization.

A polar compound can be added in a small amount as a vinylating agent or randomizing agent. Examples thereof include ethers such as diethyl ether, ethylene glycol dimethyl ether, diethylene glycol dimethyl ether, tetrahydrofuran, and 2,2-bis(2-oxolanyl)propane, amines such as triethylamine and N,N,N',N'-tetramethylethylenediamine, alkali metal alkoxides such as potassium amyl alcoholate, and the like.

Such a vinylating agent can be used as a microstructure regulator for diene moieties in the polymer in an appropriate amount according to a desired value of vinyl content.

Many vinylating agents further have an effective randomizing effect in the copolymerization of a vinylaromatic hydrocarbon and a conjugated diene. They can be used as an agent for regulating the distribution of an aromatic vinyl compound or for regulating the amount of aromatic vinyl compound polymer blocks. For randomization may be used a method in which part of the conjugated diene is intermittently added during the copolymerization, as described in Japanese Patent Laid-Open No. 140211/1984.

The polar compound may be added either en bloc or in portions in a timing such as before initiation of the polymerization, at the initiation, after the initiation and during the polymerization, etc. By addition during the polymerization or by portion-wise addition, the vinyl distribution in the polymer having different vinyl block structures can be regulated.

Examples of the organolithium compound to be used as an initiator for the polymerization of a vinylaromatic hydrocarbon and a conjugated diene in the process for producing the modified rubber of the invention include monolithium compounds such as ethyllithium, propyllithium, n-butyllithium, sec-butyllithium, tert-butyllithium, and phenyllithium, dilithium compounds such as 1,4-dilithio-n-butane and 1,3-(2-dilithio-2-hexyl)benzene, polylithium compounds obtained by modifying monolithium compounds with a polyvinyl compound such as divinylbenzene or diisopropenylbenzene, and the like.

The amount of the organolithium compound to be used is determined according to the degree of polymerization of the copolymer to be obtained. However, it is about from 2 mg to 50 mg in terms of lithium amount per 100 g of the monomers.

The organolithium compound may be used by a method in which it is added as a polymerization initiator en bloc or by a method in which it is added in portions to produce polymers having different molecular chain lengths. Furthermore, the organolithium compound can be used in a small amount for a demand treatment of the polymerization solvent, monomers, etc. before polymerization.

Examples of the compound having two or more epoxy groups per molecule to be used as a modifier in the invention include diepoxy compounds represented by general formula (1-a).

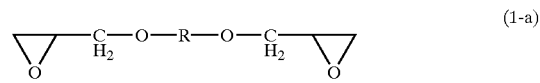

(1-a)

In the formula, R represents the following general formula (1-b), (1-c), or (1-d):

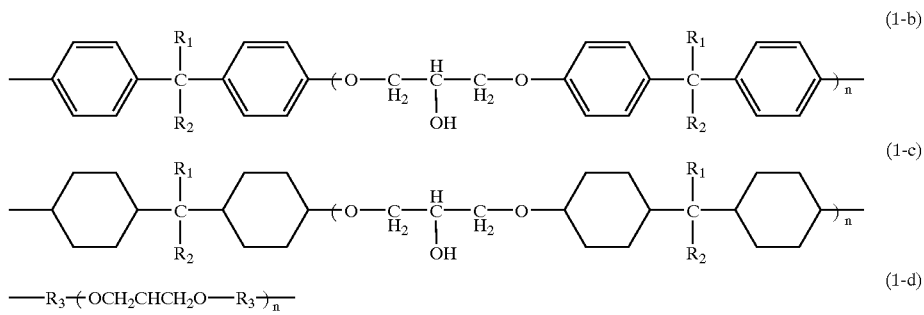

(1-b)

(1-c)

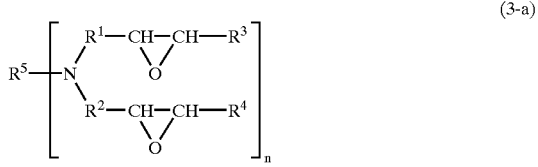

(1-d)

wherein $R_1$ and $R_2$ are hydrogen, an alkyl group having 1 to 20 carbon atoms, or a phenyl group; $R_3$ is an alkylene group having 2 to 20 carbon atoms; and n represents an integer of 0 to 10.

Specific examples thereof include bisphenol A diglycidyl ethers represented by the following formula (2-a), bisphenol F diglycidyl ethers represented by the following formula (2-b), and the like (in the formulae, n represents an integer of 0 to 10).

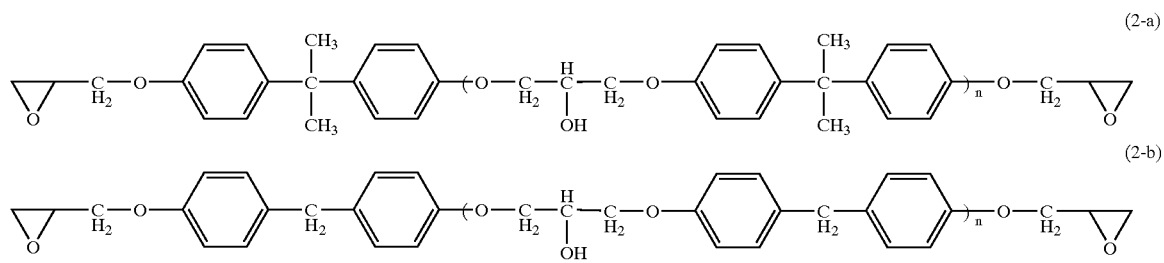

(2-a)

(2-b)

Examples thereof further include alkylene oxide-containing epoxy compounds, alicyclic epoxy compounds, carbocyclic-compound-containing epoxy compounds, and the like. A mixture of two or more of these compounds represented by general formula (1-a) can also be used.

Furthermore, polyfunctional compounds represented by the following formula (3-a), which have a diglycidylamino group, also are used as preferred modifiers.

(3-a)

$$R^5 \!-\!\!\left[\!N\!\begin{array}{c} R^1\!-\!CH\!-\!CH\!-\!R^3 \\ \diagdown\!O\!\diagup \\ R^2\!-\!CH\!-\!CH\!-\!R^4 \\ \diagdown\!O\!\diagup \end{array}\!\right]_n$$

In the formula, $R^1$ and $R^2$ are a hydrocarbon group having 1 to 10 carbon atoms or a hydrocarbon group having 1 to 10 carbon atoms and having an ether or tertiary amine; $R^3$ and $R^4$ are hydrogen, a hydrocarbon group having 1 to 20 carbon atoms, or a hydrocarbon group having 1 to 20 carbon atoms and having an ether or tertiary amine; $R^5$ is a hydrocarbon group having 1 to 20 carbon atoms or a hydrocarbon group having 1 to 20 carbon atoms and having at least one group selected from ethers, thioethers, tertiary amines, epoxy, carbonyl, halogens, and silicon; and n is 1 to 6.

Specific examples of the diglycidylamino compounds represented by general formula (3-a) include diglycidylaniline, diglycidyl-o-toluidine, tetraglycidyl-m-xylenediamine, tetraglycidyl-p-phenylenediamine, tetraglycidyl-1,3-bisaminomethylcyclohexane, tetraglycidyldiaminodiphenylmethane, and the like.

Also usable besides those are epoxidized soybean oil, epoxidized linseed oil, epoxidized polybutadiene, and the like.

Methods for adding such a compound having two or more epoxy groups in the molecule as a modifier are not particularly limited, and include a method in which after termination of the polymerization for producing a copolymer of an (R-B) structure having active lithium at an end, a given amount of the modifier is added en bloc to modify the copolymer, a method in which part of the modifier is separately added during the polymerization to conduct modification, and the like. However, the time when the modifier is added after termination of the polymerization is preferably within 30 minutes from the termination. By adding the modifier as early as possible after polymerization, a high degree of modification is obtained.

The amount of the modifier compound to be added is from 0.05 to 2.0 mol, preferably from 0.10 to 2.0 mol, more preferably from 0.20 to 2.0 mol, per mol of the initiator lithium. In the case where the addition amount is more than one equivalent to the lithium, coupling modification is slightly reduced but the amount of modified polymers which have not been coupled increases. As a result, the modified rubber has an improved affinity for silica and a more preferred silica-containing composition is obtained.

As stated above, modification with the modifier compound added in an amount more than one equivalent to the lithium gives a modified rubber having a larger amount of residual epoxy groups. It is possible to add, e.g., a lithium compound after the modification to open the epoxy groups and convert them into —OH or the like through a later treatment.

The process of the invention is a method in which a copolymer of an (R-B) structure is produced by, e.g., one-stage or multistage batch polymerization or continuous polymerization and this copolymer is modified by reacting active ends thereof with a compound having two or more epoxy groups in the molecule as a modifier.

For example, the process for producing the modified rubber of the invention represented by the general formula $(R-B)_n$-X through one-stage polymerization is as follows. Into a polymerizer which has undergone nitrogen replacement and is equipped with a stirrer are charged a polymerization solvent and the whole of a conjugated diene and vinylaromatic hydrocarbon. A small amount of a vinylating agent is further introduced according to need. An organolithium compound is added to initiate polymerization. In the case of one-stage polymerization, the amount of terminal vinylaromatic hydrocarbon polymer blocks is determined by the total bound vinylaromatic hydrocarbon content, amount of the vinylating agent, polymerization temperature, etc. Thus, a partial copolymer structure R made up of the randomly bonded vinylaromatic hydrocarbon is yielded in the former part of the polymerization. Thereafter, in the successive latter part of the polymerization, a copolymer B having a vinylaromatic hydrocarbon polymer block at an end is yielded. Thus, a copolymer having an (R-B) structure of the tapered block type is obtained. Thereafter, a modifier is added.

In the case of two-stage polymerization, for example, the process is as follows. In the first stage, a conjugated diene polymer or a random copolymer of a conjugated diene and a vinylaromatic hydrocarbon is yielded as a partial polymer structure R. In the subsequent second stage, either a vinylaromatic hydrocarbon or a conjugated diene and a vinylaromatic hydrocarbon monomer are added to yield, as a partial polymer structure B, either a vinylaromatic hydrocarbon polymer or a copolymer having a vinylaromatic hydrocarbon polymer block at an end. Thus, a copolymer having an (R-B) structure is produced. Thereafter, a modifier is added.

Furthermore, in the case of continuous polymerization, the process comprises: continuously introducing one or more first-stage monomers and an organolithium initiator into a first polymerizer to yield a partial polymer structure R; continuously introducing the polymer solution and one or more second-stage monomers into a second polymerizer to yield a partial polymer structure B and thereby obtain a copolymer of an (R-B) structure; and then adding a modifier.

The modification reaction usually terminates instantaneously. However, a modification reaction period of about from 1 minute to 120 minutes is generally required depending on the diffusibility of the modifier and the viscosity of the polymerization product.

With respect to the degree of modification, larger active-lithium amounts before modification result in satisfactorily high degrees of modification. From the standpoint of preventing the amount of active lithium from decreasing, it is preferred to use a polymerization temperature which is not so high. It is also necessary to diminish impurities such as alkenes, acetylenic compounds, water, dissolved oxygen, and the like in the starting materials to thereby minimize deactivation.

The polymerization is conducted at a temperature between about 0° C. and 130° C. However, the polymerization temperature is preferably from 20° C. to 120° C. The polymerization may be temperature-rising polymerization or isothermal polymerization.

The active lithium in the modified-rubber polymer solution thus obtained is decomposed with an alcohol, water, or the like according to need. A known stabilizer for rubbers, such as 2,6-di-tert-butyl-4-methylphenol (BHT), n-octadecyl 3-(4'-hydroxy-3',5'-di-tert-butylphenol)propinate, or 2-methyl-4,6-bis[(octylthio)methyl]phenol, is added to the solution, which is subjected to solvent removal and drying by a known technique, e.g., one with a hot press or drum dryer, steam stripping, etc. to finish the modified rubber.

The modified-rubber composition which comprises a raw rubber comprising the modified rubber thus obtained and silica will be explained.

The raw rubber comprises the modified rubber of the invention in an amount of at least 20% by weight, preferably 40% by weight or more. As other rubber(s) may be incorporated one or more of natural rubber, polybutadiene rubbers, styrene/butadiene rubbers, polyisoprene rubbers, and the like.

Proportions of the modified rubber of the invention lower than 20% by weight are undesirable in that the composition has enhanced temperature dependence and strain dependence of tan δ of viscoelasticity.

The amount of the silica incorporated in the modified-rubber composition of the invention is from 5 to 150 parts by weight, preferably from 10 to 100 parts by weight, more preferably from 20 to 80 parts by weight, per 100 parts by weight of the raw rubber.

In case where the amount of the silica incorporated is smaller than 5 parts by weight, a sufficient reinforcing effect is not obtained. In case where the amount of the silica incorporated exceeds 150 parts by weight, not only rubber elasticity is reduced but also an improvement in the temperature dependence and strain dependence of viscoelastic properties, which effect is a merit of the invention, cannot be obtained.

The silica to be used in the modified-rubber composition of the invention may be any of wet-process silica, dry-process silica, and synthetic silicate type silica. Silica having a small particle diameter has a high reinforcing effect. It is preferred to use one of the high aggregation type having a small particle diameter.

In the modified-rubber composition of the invention, a carbon black and an extender oil for rubbers can be used as other compounding ingredients preferably as long as the performance of the silica is not impaired thereby.

As the carbon black can be used various carbon blacks such as FT, SRF, FEF, HAF, ISAF, SAF, and the like. However, a carbon black having a nitrogen-adsorption specific surface area of 50 $m^2$/g or larger and a DBP absorption of 80 mL/100 g or larger is preferred.

The amount of the carbon black to be incorporated is from 0 to 50 parts by weight per 100 parts by weight of the raw rubber, and the sum of the carbon black and the silica is up to 150 parts by weight.

To the modified-rubber composition of the invention may be added a silane coupling agent as a coupling agent for the raw rubber and the silica. The amount of the silane coupling agent to be added is from 0 to 25 parts by weight, preferably from 0 to 15 parts by weight, more preferably from 0 to 10 parts by weight, per 100 parts by weight of the raw rubber.

Addition amounts of the silane coupling agent exceeding 25 parts by weight per 100 parts by weight of the raw rubber are undesirable because the results are impaired reinforcing properties and an increased cost.

Examples of the silane coupling agent to be used in the modified-rubber composition of the invention include bis[3-(triethoxysilyl)propyl] tetrasulfide, bis[3-(triethoxysilyl) propyl] disulfide, bis[2-(triethoxysilyl)ethyl] tetrasulfide, 3-mercaptopropyltrimethoxysilane, 3-triethoxysilylpropyl-N,N-dimethyithiocarbamoyl tetrasulfide, 3-triethoxysilyl-propylbenzothiazole tetrasulfide, and the like.

The modified rubber in the modified-rubber composition of the invention has an exceedingly high affinity for silica. It is therefore possible to reduce the amount of the silane coupling agent to or below 20% by weight of the ordinary amount thereof in silica-containing compositions of unmodified rubbers.

In preparing the modified-rubber composition of the invention, the temperature for the kneading of the raw rubber, silica, and other compounding ingredients is in the range of from 130 to 180° C., preferably from 135 to 170° C. It is preferred to conduct the kneading so that the silica forms sufficient binding with the raw rubber.

As the extender oil for rubbers can be used aromatic, naphthenic, and paraffinic extender oils which have been used hitherto. Also usable besides these are rubber-extending oils which are reduced in the content of polynuclear aromatic ingredients and are environmentally less harmful, such as MES, T-DAE, T-RAE, etc. The amount of the extender oil for rubbers to be used is increased or reduced according to the amount of the silica to be incorporated or of the silica and carbon black to be incorporated. The extender oil is used so as to regulate the modulus of elasticity and other properties of the vulcanized composition. Such an extender oil for rubbers may be added to a rubber solution resulting from the production of the modified rubber to finish the rubber as an oil-extended modified rubber.

The amount of the extender oil for rubbers to be incorporated is from 0 to 100 parts by weight, preferably from 5 to 60 parts by weight, per 100 parts by weight of the raw rubber. In case where the amount thereof exceeds 100 parts by weight, the results are too low hardness and deterioration of c-set, wear resistance, etc.

Besides those, a vulcanizing agent and a vulcanization accelerator are used as fillers in an amount in the range of from 1 to 20 parts by weight per 100 parts by weight of the raw rubber. Sulfur is used as a typical vulcanizing agent. Other usable vulcanizing agents are sulfur-containing compounds, peroxides, and the like.

As the vulcanization accelerator is used a sulfenamide compound, guanidine compound, thiuram compound, or the like in a necessary amount.

Besides those, chemicals for rubbers such as zinc white, stearic acid, a vulcanizing aid, antioxidant, processing aid, and the like are added according to need in an amount suitable for purposes, for example, from 0.1 to 20 parts by weight per 100 parts by weight of the raw rubber.

The modified-rubber composition of the invention can be prepared by kneading the raw rubber together with silica and other ingredients such as a carbon black, silane coupling agent, extender oil for rubbers, and chemicals for rubbers by means of an internal mixer and further incorporating a vulcanizing agent, e.g., sulfur, a vulcanization accelerator, and the like with an internal mixer or mixing rolls. This composition is molded and then vulcanized with a vulcanizing machine under pressure at a temperature of from 140 to 170° C. to thereby come to exhibit excellent performances.

As described above, the modified rubber of the invention is compounded with silica and a silane coupling agent and further with a carbon black, an extender oil for rubbers, and another filler and provided in the form of a vulcanized rubber composition. The modified-rubber composition is suitable for use in various tire applications, rubber vibration isolators, footwear articles, belts, and other industrial articles. Due to the properties of its bonded functional groups, the modified rubber of the invention can be utilized as a modifier for olefin resins, styrene resins, acrylate resins, vinyl chloride resins, polyamide resins, polyester resins, polycarbonate resins, poly(phenylene ether) resins, poly (phenylene sulfide) resins, polyacetal resins, polyurethane resins, and the like. When used in combination with asphalt in a suitably selected proportion, the modified rubber can be utilized also for road pavement, waterproofing, rust prevention, automotive prime coating, roofing, pipe coating, jointing applications, and the like.

EXAMPLES

The invention will be explained below concretely by reference to Examples, but the scope of the invention should not be construed as being limited by these Examples.

Analyses of Example samples of the modified rubber of the invention and Comparative Example samples and property measurements of compositions were conducted by the following methods.

(1) Bound Styrene Content

A rubber sample was dissolved in chloroform and the solution was examined for the absorption at UV 250 nm attributable to the phenyl group of styrene. This absorption was compared with that of standard polystyrene to determine the bound styrene content in terms of wt %.

(2) Microstructure of Butadiene Moieties

A rubber sample was dissolved in carbon disulfide, and this solution was analyzed by FT-IR in the range of from 600 to 1,000 $cm^{-1}$ using a solution cell. The vinyl content, cis content, and trans content in the butadiene moieties were determined from the absorbances at given wavelengths using Hampton's calculation formula.

(3) Styrene Block Content

A rubber sample was dissolved in chloroform and decomposed with osmium oxide. A precipitate was formed therefrom with methanol, and the styrene block content in terms of wt % was determined from the weight of the precipitate.

(4) GPC Peak Molecular Weights of Modified Rubber and Unmodified Copolymer Rubber in Terms of Standard Polystyrene A modified-rubber or an unmodified-rubber sample was dissolved in tetrahydrofuran (THF). This solution was analyzed by gel permeation chromatography (GPC), in which a polystyrene-based nonpolar column was used and an RI measurement was made. The molecular weight was determined through a comparison with standard polystyrene samples.

(5) GPC Peak Molecular Weight of Styrene Block

The styrene block sample obtained in (3) through decomposition with osmium oxide was examined under the GPC conditions used in (4) to determine the GPC peak molecular weight of the styrene block.

(6) Degree of Modification of Modified Rubber

A modified-rubber sample was dissolved in THF and an internal standard substance was added. The resultant solution was analyzed by GPC using the nonpolar column employed in (4) and by GPC using a silica-based polar column, and the degree of modification of the rubber was determined from the difference in sample elution amount therebetween.

(7) Conversion of Monomer

A polymerization solution obtained by sampling from an autoclave during polymerization was vacuum-dried to determine the solid content of the polymerization solution. The solid content as measured at the time of termination of the polymerization was taken as 100% by weight.

(8) Conversion of Styrene

The amount of unreacted styrene monomer in a polymerization solution obtained by sampling from an autoclave during polymerization was determined by gas chromatography.

[Production of Modified Rubbers of Examples and Rubbers of Comparative Examples]

Modified Rubber 1

The atmosphere in an autoclave having a capacity of 10 L equipped with a warm-water jacket and a stirrer was sufficiently replaced with nitrogen. Thereinto were charged 4.5 kg of cyclohexane, 0.25 kg of styrene, and 0.75 kg of 1,3-butadiene which each had been dehydrated with activated alumina. The contents were heated to 52° C. with stirring, and 0.76 g of n-butyllithium (20% by weight cyclohexane solution; the same applies hereinafter) was added to initiate polymerization. The polymerization temperature reached 91° C. Two minutes after the maximum polymerization temperature, 4.4 g of tetraglycidyl-1,3-bisaminomethylcyclohexane (90% by weight cyclohexane solution; the same applies hereinafter) was added and a modification reaction was conducted for 10 minutes. Ten milliliters of water/methanol (⅕ by volume) as an active-lithium decomposer was added to and mixed with the modified-rubber polymerization solution thus obtained. Thereafter, 2 g of BHT as a stabilizer was added thereto and mixed. This mixture was subjected to solvent removal and drying with a drum dryer to obtain a solid modified rubber.

The reaction mixture in the autoclave was sampled during the polymerization to obtain several samples for monomer conversion determination, and the samples were analyzed to determine the bound styrene content and styrene block content at each of monomer conversions. It was ascertained that the polymer obtained at a conversion of up to about 80% by weight was a random copolymer R having a bound styrene content of 9.5% by weight and a styrene block of 0.0% by weight.

Subsequently, the modified rubber was analyzed. This rubber had a bound styrene content of 24.9% by weight, styrene block content of 15.4% by weight, and vinyl content of 14% by mole.

It was ascertained that 20% by weight of the latter part, which was the part other than the partial polymer structure R, was a tapered block copolymer B in which the bound styrene content gradually increased to form a terminal styrene block.

The copolymer which had not been modified was examined by GPC and was found to have a molecular weight of 191,000. The styrene block of the unmodified copolymer was analyzed by GPC, and the molecular weight of the styrene block was found to be 22,100.

The degree of coupling and the degree of modification of the modified rubber with the modifier were 61% by weight and 74% by weight, respectively.

Furthermore, this modified rubber had a Mooney viscosity (ML1+4, 100° C.) of 72.

Modified Rubber 2

The same one-stage polymerization operation as for modified rubber 1 was conducted, except that 16 g of tetrahydrofuran was added before initiation of the polymerization. From the monomer conversion measurements and bound styrene analyses during the polymerization shown in Table 2 and from a styrene block analysis, it was ascertained that the former polymer part, which accounted for 70% by weight, constituted a random copolymer R having a bound styrene of 30.9% by weight and a styrene block of 0.0% by weight.

From analyses for bound styrene content and styrene block after termination of the polymerization reaction, it was ascertained that that latter part of the polymer, which accounted for 30% by weight, was a tapered terminal-styrene-block copolymer.

Details of the polymerization and results of the analyses are shown in Table 1a and Table 3a, respectively.

Modified Rubber 3

The atmosphere in an autoclave having a capacity of 10 L equipped with a warm-water jacket and a stirrer was sufficiently replaced with nitrogen. Thereinto were charged 4.5 kg of cyclohexane and 0.90 kg of 1,3-butadiene as a first-stage monomer which each had been dehydrated with activated alumina. The contents were heated to 56° C. with stirring, and 0.95 g of n-butyllithium (20% cyclohexane solution) was added to initiate polymerization. The polymerization temperature reached 82° C. Thus, the polymerization of 1,3-butadiene for yielding a polymer R was terminated. Subsequently, 0.10 kg of styrene as a second-stage monomer was added to conduct polymerization for yielding a polymer B. The maximum polymerization temperature reached 89° C. Two minutes thereafter, 1.6 g of tetraglycidyl-1,3-bisaminomethylcyclohexane was added and a modification reaction was conducted for 8 minutes. At the time when the modifier was added, the conversion of the styrene was 100.0% by weight. Ten milliliters of water/methanol as an active-lithium decomposer was added to and mixed with the modified-rubber polymerization solution thus obtained. Thereafter, 2 g of BHT as a stabilizer was added thereto and mixed. This mixture was subjected to solvent removal and drying with a drum dryer to obtain a solid modified rubber.

Analytical values for this modified rubber were a bound styrene content of 10.1% by weight, styrene block content of 9.5% by weight, vinyl content of 13.5% by mole, degree of coupling of 79% by weight, and degree of copolymer modification of 86% by weight.

The copolymer which had not been modified had a molecular weight of 122,000, and the molecular weight of the styrene block was 9,500.

Furthermore, this modified rubber had a Mooney viscosity (ML1+4, 100° C.) of 43.

Comparative Rubber 1

A rubber was produced in the same manner as for modified rubber 1, except that no modifier was added during polymerization procedure.

Comparative Rubber 2

A rubber was produced in the same manner as for modified rubber 2, except that n-butyllithium as a polymerization initiator was added in an amount of 2.1 g, and that after the polymerization, 6.0 g of tetraglycidyl-1,3-bisaminomethylcyclohexane was added to conduct a modification reaction for 10 minutes. Subsequently, the resultant rubber was finished in the same manner. However, the viscosity was so low that the finishing, in particular, was difficult. This modified rubber had a Mooney viscosity (ML1+4, 100° C.) of 13.

Modified Rubber 4

The same polymerization operation with two-stage monomer addition as for modified rubber 3 was conducted, except that 1.2 g of N,N,N',N'-tetramethylethylenediamine was added before initiation of the polymerization. Subsequently, the resultant rubber was finished in the same manner.

Modified Rubber 5

The atmosphere in an autoclave having a capacity of 10 L equipped with a warm-water jacket and a stirrer was sufficiently replaced with nitrogen. Thereinto were charged 4.5 kg of cyclohexane and 0.18 kg of styrene and 0.27 kg of 1,3-butadiene as first-stage monomers which each had been treated with activated alumina. The contents were heated to 57° C. with stirring, and 0.87 g of n-butyllithium (20% by weight cyclohexane solution) was added to initiate polymerization. At the time when the polymerization temperature reached 67° C., 1,3-butadiene began to be added to the polymerization system for 5 minutes at a rate of 0.03 kg per minute in a total amount of 0.15 kg. After termination of the addition, the polymerization temperature reached 81° C. Thus, the polymerization for yielding a random copolymer as a partial polymer structure R was terminated. Subsequently, 0.22 kg of styrene and 0.18 kg of 1,3-butadiene as second-stage monomers were added to conduct polymerization for yielding a polymer B. The maximum polymerization temperature reached 86° C. Three minutes thereafter, 4.0 g of tetraglycidyl-1,3-bisaminomethylcyclohexane was added and a modification reaction was conducted for 10 minutes. Ten milliliters of water/methanol as an active-lithium decomposer was added to and mixed with the modified-rubber polymerization solution thus obtained. Thereafter, 2 g of BHT as a stabilizer was added thereto and mixed. This mixture was subjected to solvent removal and drying with a drum dryer to obtain a solid modified rubber.

This modified rubber was a tapered terminal-styrene-block copolymer which had a bound styrene content of 39.3% by weight and a styrene block content of 10.5% by weight and in which the bound styrene gradually increased. The Mooney viscosity (ML1+4, 100° C.) thereof was 62.

Modified Rubber 6

The atmosphere in an autoclave having a capacity of 10 L equipped with a warm-water jacket and a stirrer was sufficiently replaced with nitrogen. Thereinto were charged 4.5 kg of cyclohexane and 0.88 kg of 1,3-butadiene as a first-stage monomer which each had been treated with activated alumina. The contents were heated to 59° C. with stirring, and 0.97 g of n-butyllithium (20% by weight cyclohexane solution) was added to initiate polymerization. The polymerization temperature reached 82° C. Thus, the polymerization of 1,3-butadiene for yielding a polymer R was terminated.

Subsequently, 0.12 g of styrene as a second-stage monomer was added to successively conduct polymerization. The polymerization temperature reached 89° C. Thus, a polystyrene segment was yielded as a polymer B. One minute after termination of the polymerization, 3.0 g of a mixture solution consisting of 50% by weight bisphenol A diglycidyl ether and 50% by weight bisphenol F diglycidyl ether was added and a modification reaction was conducted for 8 minutes. Ten milliliters of water/methanol as an active-lithium decomposer was added to and mixed with the modified-rubber polymerization solution thus obtained. Thereafter, 2 g of BHT as a stabilizer was added and mixed. This mixture was subjected to solvent removal and drying with a drum dryer to obtain a solid modified rubber.

Analytical values for this modified rubber were a bound styrene content of 12.0% by weight, styrene block content of 11.6% by weight, and vinyl content of 13.0% by mole. Analysis by GPC revealed that the unmodified copolymer had a molecular weight of 122,000 and the styrene block had a molecular weight of 10,100.

The modified rubber had a degree of coupling of 82% by weight and a degree of modification of 88% by weight.

Furthermore, this modified rubber had a Mooney viscosity (ML1+4, 100° C.) of 43.

Modified Rubber 7

The same production process as for modified rubber 2 was conducted, except that 4.7 g of tetraglycidyl-1,3-bisaminomethylcyclohexane was added to conduct a modification reaction for 10 minutes, that 0.22 g of n-butyllithium was then further added as an agent for treating the unreacted modifier epoxy groups and reacted for 5 minutes, and that the reaction mixture was thereafter discharged from the autoclave and simultaneously mixed with 10 mL of water/methanol. Subsequently, the resultant rubber was finished in the same manner as modified rubber 1.

From the determination of monomer conversion, bound styrene, etc. during the polymerization shown in Table 2, the following was ascertained. In this modified rubber, the former polymer part, which accounted for about 70% by weight, had a random partial copolymer structure R having a bound styrene of 30.8% by weight and a styrene block of 0.0% by weight, as in the case of modified rubber 2.

Comparative Rubber 3

The same production process as for modified rubber 5 was conducted, except that no modifier was used in the polymerization procedure.

Comparative Rubber 4

The same polymerization process as for modified rubber 1 was conducted, except that twenty-four grams of tetrahydrofuran was added to modified rubber 1 and polymerized, and that after the polymerization, 4.5 g of tetraglycidyl-1,3-bisaminomethylcyclohexane was added to modify the rubber. Subsequently, the resultant rubber was finished in the same manner as modified rubber 1.

The styrene block amount in the modified rubber obtained was as small as 1.4% by weight. Furthermore, as apparent from the monomer conversion and bound styrene content shown in Table 2, this modified rubber was a copolymer in which most of the monomer units were randomly arranged.

The other analytical values are shown in Table 3b.

Comparative Rubber 5

The atmosphere in an autoclave having a capacity of 10 L equipped with a warm-water jacket and a stirrer was sufficiently replaced with nitrogen. Thereinto were charged 4.5 kg of cyclohexane and 0.20 kg of styrene as a first-stage monomer which each had been treated with activated alumina. The contents were heated to 57° C. with stirring, and 0.92 g of n-butyllithium (20% by weight cyclohexane solution) was added to initiate polymerization. The polymerization temperature reached 68° C. Thus, the first-stage polymerization was terminated.

Subsequently, 0.80 kg of 1,3-butadiene as a second-stage monomer was added to successively conduct polymerization. The polymerization temperature reached 86° C. before the polymerization was terminated. One minute after termination of the polymerization, 2.6 g of a mixture solution consisting of 50% bisphenol A diglycidyl ether and 50% bisphenol F diglycidyl ether was added and a modification reaction was conducted for 8 minutes. Ten milliliters of water/methanol as an active-lithium decomposer was added to and mixed with the modified-rubber polymerization solution thus obtained. Thereafter, 2 g of BHT as a stabilizer was added and mixed. This mixture was subjected to solvent removal and drying with a drum dryer to obtain a solid modified rubber.

Analytical values for this modified rubber were a bound styrene content of 20.0% by weight, styrene block content of 19.5% by weight, and vinyl content of 14.0% by mole. Analysis by GPC revealed that the modified rubber had a molecular weight of 224,000 and the styrene block before the modification had a molecular weight of 17,100.

This modified rubber had a degree of coupling of 81% by weight and a degree of modification of 88% by weight.

Furthermore, the Mooney viscosity of this modified rubber was unable to be measured.

The various modified rubbers of the invention and various comparative rubbers thus produced were kneaded together with silica, a silane coupling agent, and other compounding ingredients in the following manner to obtain modified-rubber compositions of the invention.

(Method of Kneading)

A pressure kneader having a capacity of 0.3 L equipped with a temperature controller was used to knead a raw rubber together with silica, carbon black, a silane coupling agent, a naphthene oil, zinc white, stearic acid, etc.

A two-stage kneading method was used, in which the first-stage kneading period was 5 minutes and the maximum kneading temperature was regulated to 161° C.

The compound obtained by the first-stage kneading was cooled to room temperature and kneaded again for 3 minutes, during which the maximum temperature was regulated to 158° C. The compound obtained by the second-stage kneading was cooled to room temperature, and then mixed with an antioxidant, sulfur, and vulcanization accelerators by means of a 70° C. open roll mill.

Examples 1 to 7 and Comparative Examples 1 to 4

Modified rubbers 1 to 7 of the invention and comparative rubbers 1 to 4 were kneaded and compounded according to the following formulation 1 to obtain compositions of Examples 1 to 7 and Comparative Examples 1 to 4, respectively. In the following formulation, "parts" means "parts by weight".

| <Formulation 1> | |
|---|---|
| Rubber | 100.0 parts |
| Silica (Ultrasil VN3) | 40 parts |
| Silane coupling agent (Si69) | 2 parts |
| Naphthene oil (Shellflex 371J) | 5 parts |
| Zinc white | 5 parts |
| Stearic acid | 2 parts |
| Antioxidant (SP) | 1 part |
| Sulfur | 1.7 parts |
| Vulcanization accelerator DM | 1.5 parts |
| Vulcanization accelerator D | 1.5 parts |
| Total | 159.7 parts |

These compositions were molded, vulcanized with a vulcanizing machine at 160° C. for 20 minutes, and examined for the following performances.

Comparative Example 5

Comparative rubber 5 which was a thermoplastic elastomer having two or more styrene blocks in the molecule was used. This rubber was compounded according to the same formulation as in Example 1 to obtain a composition of Comparative Example 5. However, this composition had considerably poor processability and was difficult to knead with a kneader and unable to be processed with rolls. Consequently, the subsequent evaluation was omitted.

1) Tensile Strength

Tensile strength was measured by the tensile test method in accordance with JIS-K6251.

2) Strain Dependence and Temperature Dependence of tan δ

ARES viscoelasticity tester, manufactured by Rheometric Scientific, Inc., was used to measure the tan δ at 0° C., 50° C., and 70° C. in the torsion mode at a frequency of 10 Hz. The dependences were calculated using the following equations.

The strain dependence is a value calculated from found values at 50° C. using the following.

(10% tan δ−0.1% tan δ)×100(%)/0.1% tan δ

The temperature dependence is a value calculated using the following.

(3% tan δ(0° C.)−3% tan δ(50° C.))×100(%)/3% tan δ(50° C.)

3) Compression Set (C-Set)

Measurement was made by the compression set test method in accordance with JIS-K6301 under the conditions of 70° C. and 22 hours.

The properties of the vulcanized compositions are shown in Table 4a and Table 4b.

Examples 8 to 10 and Comparative Examples 6 and 7

Furthermore, vulcanizate properties of compositions according to the following formulation 2 are shown in Table 5.

<Formulation 2>

|  |  |  | Ex. 8 | Ex. 9 | Ex. 10 | Comp. Ex. 6 | Comp. Ex. 7 |
|---|---|---|---|---|---|---|---|
| Modified rubber 1 |  | (parts) | 70 | 40 |  |  |  |
| Modified rubber 5 |  | (parts) |  |  | 60 |  |  |
| Modified rubber 7 |  | (parts) |  |  |  | 70 |  |
| E-SBR | note 1) | (parts) | 30 |  | 40 |  | 100 |
| BR | note 2) | (parts) |  | 60 |  | 30 |  |
| Silica | note 3) | (parts) | 30 | 40 | 40 | 3 | 40 |
| Carbon N339 | note 4) | (parts) | 10 | 0 | 0 | 37 | 0 |
| Silane coupling agent | note 5) | (parts) | 1.5 | 2.0 | 2.0 | 2.0 | 2.0 |
| Naphthene oil |  | (parts) | 5.0 | 5.0 | 5.0 | 5.0 | 5.0 |
| Zinc white |  | (parts) | 5.0 | 5.0 | 5.0 | 5.0 | 5.0 |
| Stearic acid |  | (parts) | 2.0 | 2.0 | 2.0 | 2.0 | 2.0 |
| Antioxidant (SP) |  | (parts) | 1.0 | 1.0 | 1.0 | 1.0 | 1.0 |
| Sulfur |  | (parts) | 1.7 | 1.7 | 1.7 | 1.7 | 1.7 |
| Vulcanization accelerator DM |  | (parts) | 1.5 | 1.5 | 1.5 | 1.5 | 1.5 |
| Vulcanization accelerator D |  | (parts) | 1.5 | 1.5 | 1.5 | 1.5 | 1.5 |

Note 1) Emulsion SBR 1502, manufactured by Nippon Zeon Co., Ltd.
Note 2) D-35, manufactured by Asahi Kasei Corporation
Note 3) Trade name, ULTRASIL VN3; manufactured by Degussa AG
Note 4) Trade name, Seast KH; manufactured by Tokai Carbon Co., Ltd.
Note 5) Silane coupling agent Si69, manufactured by Degussa AG Substance name: bis[3-(triethoxysilyl)propyl] tetrasulfide TABLE 1a

|  |  | Modified rubber 1 | Modified rubber 2 | Modified rubber 3 | Comp. rubber 1 | Comp. rubber 2 |
|---|---|---|---|---|---|---|
| n-Butyllithium (g) |  | 0.76 | 0.80 | 0.95 | 0.76 | 2.10 |
| Tetrahydrofuran (g) |  | 0 | 16 | 0 | 0 | 20 |
| Polymerization temperature (° C.) | Initial temperature | 52 | 49 | 56 | 51 | 42 |
|  | Maximum temperature | 91 | 96 | 89 | 88 | 104 |
| First-stage monomer (kg) | Styrene | 0.25 | 0.43 | 0.00 | 0.25 | 0.43 |
|  | 1,3-Butadiene | 0.75 | 0.57 | 0.90 | 0.75 | 0.57 |
| Second-stage monomer (kg) | Styrene | 0 | 0 | 0.10 | 0 | 0 |
|  | 1,3-Butadiene | 0 | 0 | 0.00 | 0 | 0 |
| Tetraglycidyl-1,3-bisaminomethyl-cyclohexane (g) |  | 4.4 | 2.3 | 1.6 | 0 | 6.0 |

TABLE 1b

|  |  | Modified rubber 4 | Modified rubber 5 | Modified rubber 6 | Modified rubber 7 | Comp. rubber 3 | Comp. rubber 4 | Comp. rubber 5 |
|---|---|---|---|---|---|---|---|---|
| n-Butyllithium (g) |  | 0.68 | 0.87 | 0.97 | 0.82 | 0.87 | 0.77 | 0.92 |
| Tetrahydrofuran (g) |  | 0 | 20 | 0 | 17 | 20 | 24 | 0 |
| N,N,N',N'-Tetramethyl-ethylenediamine (g) |  | 1.2 |  |  |  |  |  |  |
| Polymerization temperature (° C.) | Initial temperature | 50 | 57 | 59 | 49 | 58 | 52 | 57 |
|  | Maximum temperature | 82 | 86 | 89 | 97 | 89 | 101 | 86 |
| First-stage monomer (kg) | Styrene | 0.10 | 0.18 | 0 | 0.43 | 0.18 | 0.23 | 0.20 |
|  | 1,3-Butadiene | 0.78 | 0.27 | 0.88 | 0.57 | 0.27 | 0.77 | 0 |
|  | Additional 1,3-butadiene | 0 | 0.15 | 0 | 0 | 0.15 | 0 | 0 |
| Second-stage monomer (kg) | Styrene | 0.12 | 0.22 | 0.12 | 0 | 0.22 | 0 | 0 |
|  | 1,3-Butadiene | 0 | 0.18 | 0 | 0 | 0.18 | 0 | 0.80 |

TABLE 1b-continued

|  | Modified rubber 4 | Modified rubber 5 | Modified rubber 6 | Modified rubber 7 | Comp. rubber 3 | Comp. rubber 4 | Comp. rubber 5 |
|---|---|---|---|---|---|---|---|
| Tetraglycidyl-1,3-bisaminomethyl-cyclohexane (g) | 5.5 | 4.0 | (*3.0) | 4.7 | 0 | 4.5 | (*2.6) |
| Epoxy-treated n-butyllithium (g) | 0 | 0 | 0 | 0.22 | 0 | 0 | 0 |

The modifier indicated by the symbol * is a mixture of 50 wt % bisphenol A glycidyl ether represented by general formula (2-a) and 50 wt % bisphenol F glycidyl ether represented by general formula (2-b).

TABLE 2

| Modified rubber 1 | Monomer conversion (%) | 26 | 42 | 55 | 68 | 78 | 89 | 100 |
| | Bound styrene (%) | 7.6 | 8.1 | 8.4 | 8.5 | 9.5 | 15.7 | 24.9 |
| Modified rubber 2 | Monomer conversion (%) | 31 | 46 | 53 | 61 | 72 | 90 | 100 |
| | Bound styrene (%) | 29.7 | 30.2 | 30.6 | 30.4 | 30.9 | 36.5 | 43.1 |
| Modified rubber 7 | Monomer conversion (%) | 27 | 38 | 49 | 67 | 81 | 93 | 100 |
| | Bound styrene (%) | 29.4 | 29.7 | 30.3 | 30.8 | 32.5 | 38.8 | 42.9 |
| Comp. rubber 1 | Monomer conversion (%) | 35 | 49 | 56 | 70 | 86 | 91 | 100 |
| | Bound styrene (%) | 8.2 | 8.1 | 8.4 | 8.5 | 10.0 | 17.2 | 24.4 |
| Comp. rubber 2 | Monomer conversion (%) | — | — | 51 | 69 | 82 | 88 | 100 |
| | Bound styrene (%) | — | — | 27.3 | 28.0 | 30.9 | 35.3 | 43.1 |
| Comp. rubber 4 | Monomer conversion (%) | 41 | 53 | 59 | 68 | 79 | 94 | 100 |
| | Bound styrene (%) | 18.1 | 18.4 | 18.4 | 18.6 | 19.2 | 20.4 | 23.0 |

TABLE 3a

|  | Modified rubber 1 | Modified rubber 2 | Modified rubber 3 | Comp. rubber 1 | Comp. rubber 2 |
|---|---|---|---|---|---|
| [Partial Polymer Structure R] | | | | | |
| Part (%) | 80 | 70 | 90 | 80 | 70 |
| Bound styrene (%) | 9.5 | 30.9 | 0 | 10 | 28 |
| Styrene block (%) | 0.0 | 0.0 | — | 0.0 | 0.0 |
| [Whole Rubber] | | | | | |
| Bound styrene (%) | 24.9 | 43.1 | 10.1 | 24.4 | 43.1 |
| Styrene block (%) | 15.4 | 13.7 | 9.5 | 14.2 | 18.0 |
| Vinyl (%) | 14 | 25 | 13.5 | 14.5 | 22 |
| [GPC] | | | | | |
| Molecular weight of modified rubber (× 10000) | 58.2 | 55.2 | 36.7 | 18.8 | 8.1 |
| Molecular weight before modification (× 10000) | 19.1 | 17.8 | 12.2 | 18.8 | 2.8 |
| Molecular weight of unmodified styrene block (× 10000) | 2.21 | 0.94 | 0.95 | 2.10 | 0.53 |
| Degree of modification (%) | 74 | 78 | 86 | 0 | 92 |
| Degree of coupling (%) | 61 | 70 | 79 | 0 | 81 |
| Shape of styrene block | tapered | tapered | complete | tapered | tapered |

TABLE 3b

|  | Modified rubber 4 | Modified rubber 5 | Modified rubber 6 | Modified rubber 7 | Comp. rubber 3 | Comp. rubber 4 | Comp. rubber 5 |
|---|---|---|---|---|---|---|---|
| [Partial Polymer Structure R] | | | | | | | |
| Part (%) | 88 | 60 | 88 | 70 | 60 | 94 | 20 |
| Bound styrene (%) | 11.3 | 29.7 | 0.0 | 30.8 | 30.0 | 20.4 | 100 |
| Styrene block (%) | 0.0 | 0.0 | 0.0 | 0.0 | 0.0 | 0.0 | 97.5 |
| [Whole Rubber] | | | | | | | |
| Bound styrene (%) | 21.5 | 39.3 | 12.0 | 42.9 | 40.1 | 23.0 | 20 |
| Styrene block (%) | 11.2 | 10.5 | 11.6 | 14.4 | 11.5 | 1.4 | 19.5 |
| Vinyl (%) | 62 | 34 | 13 | 26 | 32 | 35 | 14 |
| [GPC] | | | | | | | |
| Molecular weight of modified rubber (× 10000) | 83.3 | 49.6 | 37.0 | 50.6 | 15.3 | 47.3 | 22.4 |
| Molecular weight before modification (× 10000) | 32.7 | 15.3 | 12.2 | 17.5 | 15.2 | 14.8 | 6.7 |
| Molecular weight of unmodified styrene block (× 10000) | 2.40 | 1.47 | 1.01 | 1.89 | 1.38 | 0.21 | 1.71 |
| Degree of modification (%) | 71 | 80 | 88 | 81 | 0 | 83 | 88 |
| Degree of coupling (%) | 58 | 69 | 82 | 67 | 0 | 77 | 81 |
| Shape of styrene block | complete | tapered | complete | tapered | tapered | slightly tapered | thermoplastic elastomer |

TABLE 4a

|  | Example 1 Modified rubber 1 | Example 2 Modified rubber 2 | Example 3 Modified rubber 3 | Comp. Example 1 Comp. rubber 1 | Comp. Example 2 Comp. rubber 2 |
|---|---|---|---|---|---|
| Hardness, Shore A | 71 | 82 | 59 | 80 | 89 |
| [Tensile Property] | | | | | |
| 300% Modulus (MPa) | 10.3 | 11.1 | 5.7 | 8.9 | 5.1 |
| Tensile strength (MPa) | 15.9 | 15.6 | 13.6 | 12.1 | 9.3 |
| Elongation (%) | 460 | 430 | 480 | 420 | 490 |
| Luepke rebound resilience (%) | | | | | |
| 0° C. | 54 | 28.5 | 57 | 38 | 25.5 |
| 70° C. | 68.5 | 61 | 70.5 | 44.5 | 39 |
| c-set (25% compression) 70° C., 22 hr (%) | 21 | 26 | 18 | 41 | 57 |
| tanδ  0° C.  strain 0.1% | 0.129 | 0.216 | 0.101 | 0.133 | 0.231 |
|        strain 3.0% | 0.137 | 0.239 | 0.106 | 0.146 | 0.294 |
|        strain 10% | 0.140 | 0.246 | 0.115 | 0.171 | 0.358 |
|      50° C.  strain 0.1% | 0.097 | 0.189 | 0.083 | 0.114 | 0.138 |
|        strain 3.0% | 0.104 | 0.196 | 0.085 | 0.137 | 0.162 |
|        strain 10% | 0.109 | 0.202 | 0.091 | 0.156 | 0.194 |
|      70° C.  strain 0.1% | 0.113 | 0.192 | 0.084 | 0.211 | 0.252 |
|        strain 3.0% | 0.121 | 0.221 | 0.092 | 0.304 | 0.349 |
|        strain 10 % | 0.125 | 0.224 | 0.093 | 0.316 | 0.360 |
| Strain dependence of 50° C. tanδ note 6) | 12.3 | 6.9 | 9.6 | 36.8 | 40.6 |
| Temperature dependence of 3% tanδ note 7) | 24.1 | 18.0 | 19.8 | 54.9 | 53.6 |

Note 6) (10% tanδ − 0.1% tanδ) × 100 (%)/0.1% tanδ at 50° C.
Note 7) (3% tanδ (0° C.) − 3% tanδ (50° C.)) × 100 (%)/3% tanδ (50° C.)

TABLE 4b

|  | Example 4 Modified rubber 4 | Example 5 Modified rubber 5 | Example 6 Modified rubber 6 | Example 7 Modified rubber 7 | Comp. Example 3 Comp. rubber 3 | Comp. Example 4 Comp. rubber 4 |
|---|---|---|---|---|---|---|
| Hardness, Shore A | 68 | 79 | 62 | 82 | 89 | 64 |
| [Tensile Property] | | | | | | |
| 300% Modulus (MPa) | 12.3 | 10.7 | 6.8 | 12.9 | 11.5 | 7.2 |
| Tensile strength (MPa) | 17.9 | 15.5 | 14.2 | 17.2 | 15.7 | 13.6 |
| Elongation (%) | 470 | 470 | 420 | 430 | 450 | 440 |

TABLE 4b-continued

|  |  | Example 4 Modified rubber 4 | Example 5 Modified rubber 5 | Example 6 Modified rubber 6 | Example 7 Modified rubber 7 | Comp. Example 3 Comp. rubber 3 | Comp. Example 4 Comp. rubber 4 |
|---|---|---|---|---|---|---|---|
| Luepke rebound resilience (%) | | | | | | | |
| 0° C. | | 56.5 | 39.5 | 55.5 | 29 | 4.8 | 33 |
| 70° C. | | 73 | 63.5 | 70 | 61.5 | 41 | 75 |
| c-set (25% compression) 70° C., 22 hr (%) | | 15 | 21 | 18 | 29 | 43 | 25 |
| tan δ | 0° C. strain 0.1% | 0.133 | 0.183 | 0.110 | 0.231 | 0.801 | 0.180 |
| | strain 3.0% | 0.146 | 0.198 | 0.113 | 0.256 | 0.822 | 0.206 |
| | strain 10% | 0.151 | 0.207 | 0.127 | 0.284 | 0.835 | 0.220 |
| | 50° C. strain 0.1% | 0.118 | 0.135 | 0.089 | 0.193 | 0.144 | 0.078 |
| | strain 3.0% | 0.132 | 0.149 | 0.093 | 0.206 | 0.205 | 0.102 |
| | strain 10% | 0.140 | 0.152 | 0.101 | 0.214 | 0.274 | 0.111 |
| | 70° C. strain 0.1% | 0.124 | 0.136 | 0.094 | 0.205 | 0.193 | 0.065 |
| | strain 3.0% | 0.139 | 0.154 | 0.102 | 0.217 | 0.298 | 0.094 |
| | strain 10% | 0.147 | 0.159 | 0.110 | 0.223 | 0.356 | 0.096 |
| Strain dependence of 50° C. tan δ note 6) | | 18.6 | 12.6 | 13.5 | 5.7 | 90.3 | 42.3 |
| Temperature dependence of 3% tan δ note 7) | | 10.6 | 32.9 | 21.5 | 24.3 | 301.0 | 102.0 |

Note 6) (10% tan δ − 0.1% tan δ) × 100 (%)/0.1% tan δ at 50° C.
Note 7) (3% tan δ (0° C.) − 3% tan δ (50° C.)) × 100 (%)/3% tan δ (50° C.)

TABLE 5

|  |  | Example 8 | Example 9 | Example 10 | Comp. Example 6 | Comp. Example 7 |
|---|---|---|---|---|---|---|
| Hardness, Shore A | | 67 | 58 | 71 | 84 | 64 |
| [Tensile Property] | | | | | | |
| 300% Modulus (MPa) | | 8.9 | 7.9 | 9.4 | 8.5 | 6.6 |
| Tensile strength (MPa) | | 18.2 | 13.6 | 16.5 | 12.6 | 20.0 |
| Elongation (%) | | 490 | 410 | 460 | 390 | 540 |
| Luepke rebound resilience (%) | | | | | | |
| 0° C. | | 41 | 55 | 43.5 | 31 | 35 |
| 70° C. | | 69.5 | 71.5 | 69 | 64 | 70.5 |
| c-set (25% compression) 70° C., 22 hr (%) | | 20 | 18 | 19 | 26 | 21 |
| tan δ | 0° C. strain 0.1% | 0.141 | 0.113 | 0.176 | 0.318 | 0.150 |
| | strain 3.0% | 0.159 | 0.129 | 0.202 | 0.398 | 0.209 |
| | strain 10% | 0.166 | 0.131 | 0.211 | 0.413 | 0.227 |
| | 50° C. strain 0.1% | 0.095 | 0.082 | 0.125 | 0.149 | 0.084 |
| | strain 3.0% | 0.108 | 0.107 | 0.139 | 0.163 | 0.115 |
| | strain 10% | 0.110 | 0.108 | 0.143 | 0.172 | 0.116 |
| | 70° C. strain 0.1% | 0.096 | 0.066 | 0.123 | 0.145 | 0.067 |
| | strain 3.0% | 0.112 | 0.084 | 0.138 | 0.153 | 0.092 |
| | strain 10% | 0.113 | 0.084 | 0.142 | 0.167 | 0.093 |
| Strain dependence of 50° C. tan δ note 6) | | 5.3 | 31.7 | 14.4 | 15.4 | 38.1 |
| Temperature dependence of 3% tan δ note 7) | | 32.0 | 17.1 | 31.2 | 59.0 | 44.5 |

Note 6) (10% tan δ − 0.1% tan δ) × 100 (%)/0.1% tan δ at 50° C.
Note 7) (3% tan δ (0° C.) − 3% tan δ (50° C.)) × 100 (%)/3% tan δ (50° C.)

INDUSTRIAL APPLICABILITY

The modified rubber of the invention has an excellent affinity especially for silica and is suitable for use in various silica-containing compositions.

Furthermore, the modified-rubber composition containing the modified rubber of the invention in a specific amount has excellent resistance to compression set (c-set) and excellent viscoelastic properties and is reduced in the strain dependence and temperature dependence of tan δ, as shown in Table 4a, Table 4b, and Table 5.

When used for rubber vibration isolators, the modified-rubber composition of the invention, which has such excellent properties, changes little in performance with changing ambient conditions because the strain dependence and temperature dependence of tan δ are small. The composition is hence extremely useful.

Moreover, the modified-rubber composition of the invention has moderate hardness, excellent c-set, etc. It can hence be seen that the composition has excellent properties also in footwear applications.

The modified-rubber composition of the invention, which has such excellent properties, can be advantageously used also in other industrial articles, etc.

While the invention has been described in detail and with reference to specific embodiments thereof, it will be apparent to one skilled in the art that various changes and modifications can be made therein without departing from the spirit and scope thereof.

This application is based on a Japanese patent application filed on Feb. 15, 2001 (Japanese Patent Application No. 2001-038386), the contents thereof being hereby incorporated by reference.

What is claimed is:

1. A modified rubber comprising a modified copolymer represented by the general formula $(R-B)_n-X$ obtained by modifying a copolymer having an (R-B) structure, wherein the modified rubber has a total bound vinylaromatic hydrocarbon content of from 5 to 60% by weight, a bound vinylaromatic hydrocarbon polymer block content of from 3 to 40% by weight, and a vinyl content in the conjugated diene moieties of 80% by mole or lower and the main-peak molecular weight of the molecules which have been coupled by a modifier is from 100,000 to 1,500,000 as determined by GPC, wherein, in the formulae, R represents a conjugated diene polymer or a vinylaromatic hydrocarbon/conjugated diene random copolymer having a bound vinylaromatic hydrocarbon content of 50% by weight or lower; B represents a vinylaromatic hydrocarbon/conjugated diene copolymer having a vinylaromatic hydrocarbon polymer block or represents a vinylaromatic hydrocarbon polymer block, the R/B weight ratio being in the range of from 30/70 to 97/3; n is an integer of 1 or larger; and X represents a modification residue of a compound having two or more epoxy groups per molecule.

2. The modified rubber of claim 1, wherein X is a modification residue of a compound having two or more epoxy groups and one or more nitrogen atoms per molecule.

3. The modification rubber of claim 1, wherein X is a modification residue of a glycidylamino compound.

4. The modified rubber of claim 1, wherein the copolymer having an (R-B) structure before modification has a molecular weight of from 30,000 to 500,000, the vinylaromatic hydrocarbon polymer block has a molecular weight of from 5,000 to 50,000, and the degree of modification with the compound having two or more epoxy groups per molecule is 20% by weight or higher.

5. A process for producing the modified rubber of claim 1 which comprises: producing a block copolymer having an (R-B) structure comprising a vinylaromatic hydrocarbon and a conjugated diene by a solution polymerization method using an organolithium compound as an initiator; and modifying the copolymer by reacting active ends of the copolymer with a compound having two or more epoxy groups per molecule.

6. The process of claim 5, wherein the compound having two or more epoxy groups per molecule is added in an amount of from 0.05 to 2 mol per mol of the active lithium at ends of the unmodified copolymer.

7. A modified-rubber composition which comprises 100 parts by weight of a raw rubber comprising the modified rubber of claim 1 and from 5 to 150 parts by weight of silica.

8. The modified-rubber composition of claim 7, wherein the copolymer having an (R-B) structure before modification has a molecular weight of from 30,000 to 500,000, the vinylaromatic hydrocarbon polymer block has a molecular weight of from 5,000 to 50,000, and the degree of modification with the compound having two or more epoxy groups per molecule is 20% by weight or higher.

9. The modified-rubber composition of claim 7, wherein the raw rubber comprises from 99 to 20% by weight the modified rubber and from 1 to 80% by weight at least one rubber selected from natural rubber, polybutadiene rubbers, styrene/butadiene rubbers, and polyisoprene rubbers.

10. A rubber vibration isolator which comprises the modified-rubber composition of claims 7 to 9.

11. An article of footwear which comprises the modified-rubber composition of claims 7 to 9.

12. The modified rubber of claim 1, wherein a vinylaromatic hydrocarbon polymer block segment of B in the rubber is directly bonded to X.

13. The modified rubber of claim 1, wherein a low-molecular conjugated diene polymer or low-molecular conjugated diene/vinylaromatic hydrocarbon random copolymer of B in the rubber is directly bonded to X, and wherein said low-molecular conjugated diene polymer and said low-molecular conjugated diene/vinylaromatic hydrocarbon random copolymer have a molecular weight of lower than 5,000.

* * * * *